United States Patent Office 3,038,921
Patented June 12, 1962

3,038,921
10-PHENOXARSINYL ESTERS
Stanley J. Strycker and Joseph E. Dunbar, Midland, Mich., assignors to The Dow Chemical Company, Midland, Mich., a corporation of Delaware
No Drawing. Filed Jan. 3, 1961, Ser. No. 79,969
6 Claims. (Cl. 260—440)

This invention is directed to S-(10-phenoxarsinyl) esters of the alkane dithioldicarboxylic acids, thiolalkanoic acids, alkyl xanthic acids, lower-alkenyl xanthic acids, cyclohexyl xanthic acid, cyclohexyl lower-thiolalkanoic acids, phenyl lower-thiolalkanoic acids, phenoxy lower-thiolalkanoic acids and the substituted lower-thiolalkanoic acids wherein the substituents are selected from chlorophenoxy, chlorophenyl, bromophenoxy, bromophenyl, lower-alkoxyphenoxy, lower-alkylphenoxy, lower-alkoxyphenyl and lower-alkylphenyl. In the present specification and claims, lower-alkenyl, lower-alkyl and lower-alkoxy are employed to refer to radicals containing from 1–5 carbon atoms, inclusive, and lower-thiolalkanoic acids to refer to thiolalkanoic acids containing from 1–5 carbon atoms, inclusive.

These compounds are liquid or crystalline solid materials which are somewhat soluble in many common organic salts and of very low solubility in water. The compounds are useful as parasiticides and are adapted to be employed as active toxicants of compositions for the control of mite, insect, bacterial and fungal organisms such as ascarids, pinworms, ticks, nematodes, aphids, beetles, worms and *Rhizoctonia solani*. The compounds are also useful as herbicides for the control of the growth of many weed and grass species such as pigweed, millet, wild oats, and Cabomba.

The S-(10-phenoxyarsinyl) esters of the alkane dithioldicarboxylic acids, thiolalkanoic acids and substituted lower-thiolalkanoic acids may be prepared by reacting 10,10'-oxybisphenoxarsine with an acid from the group consisting of the alkane dithioldicarboxylic acids, thiolalkanoic acids, and substituted lower-thiolalkanoic acids in which the substituents are selected from cyclohexyl, phenyl, phenoxy, halophenyl, halophenoxy, alkylphenyl, alkylphenoxy, alkoxyphenyl and alkoxyphenoxy. Representative acids include those contining up to 18 carbon atoms such as dithiolmalonic acid, dithiolsuccinic acid, dithiolglutaric acid, dithioladipic acid, dithiolpimelic acid, dithiolsuberic acid, dithiolazelaic acid, dithiolsebacic acid, dithioldodecanedioic acid, dithioltridecanedioic acid, dithiolhexadecanedioic acid, thiolacetic acid, thiolheptanoic acid, thioldodecanoic acid, thioltridecanoic acid, thiolmyristic acid, thioldecanoic acid, thiolundecanoic acid, thiolpalmitic acid, thiolstearic acid, thiolbenzoic acid, cyclohexanethiolcarboxylic acid, phenylthiolacetic acid, cyclohexylthiolacetic acid, β-phenylthiolpropionic acid, α-phenylthiolbutyric acid, β-cyclohexylthiolbutyric acid, and α-phenylthiolvaleric acid, 4-pentoxyphenylthiolacetic acid, 3-methylthiolbenzoic acid, chlorophenylthiolacetic acid, 4-propoxyphenoxythiolacetic acid, α-(2-methylphenoxy)-thiolpropionic acid, chlorophenoxythiolbutyric acids, bromothiolbenzoic acids and bromophenoxythiolvaleric acids.

The reaction conveniently is carried out in the presence of an inert organic liquid such as benzene, toluene or xylene as reaction medium. The amount of the reagents to be employed is not critical, some of the desired ester products being obtained when employing any proportions of the reactants. In the preferred method of operation, good results are obtained when employing about one molecular proportion of the 10,10'-oxybisphenoxarsine with about two molecular proportions of the monocarboxylic acid reactants, or with from about one to two molecular proportions of the dicarboxylic acid reactants. When employing the dicarboxylic acids, either a mono- or diester compound is obtained depending upon whether 2 or 1 molecular proportion of the acid is employed. The reaction takes place readily at temperatures of from 15° to 175° C. with the production of the desired product and water of reaction. In carrying out the reaction, the 10,10'-oxybisphenoxarsine and acid reactant are mixed and contacted together in any convenient fashion and the resulting mixture thereafter heated for a short period of time to complete the reaction.

Upon completion of the reaction, any reaction medium may be removed from the reaction mixture by evaporation to obtain the desired product as a residue. The latter may be further purified by conventional procedures such as washing with a non-polar solvent (i.e. cyclohexane or ligroin) and recrystallization from various organic solvents.

The 10-phenoxarsinyl esters of the present invention may be prepared by reacting 10-chlorophenoxarsine or 10-bromophenoxarsine with the alkali metal salt of an acid selected from the alkane dithioldicarboxylic acids, lower alkenyl xanthic acids, alkyl xanthic acids, cyclohexyl xanthic acids, thiolalkanoic acids and the substituted lower-thiolalkanoic acids wherein the substituents are selected from cyclohexyl, phenyl, phenoxy, halophenyl, halophenoxy, alkylphenyl, alkylphenoxy, alkoxyphenyl and alkoxyphenoxy. Representative acids comprise those previously mentioned and the xanthic acids including those containing up to 18 carbon atoms, such as methyl xanthic acid, propyl xanthic acid, amyl xanthic acid, octyl xanthic acid, decyl xanthic acid, dodecyl xanthic acid, tridecyl xanthic acid and octadecyl xanthic acid. Representative lower alkenyl xanthic acids include acids wherein the alkenyl structure contains up to five carbon atoms such as allyl xanthic acid, methylallyl xanthic acid, 4-pentenyl xanthic acid, and 3-butenyl xanthic acid. The reaction conveniently is carried out in a liquid material as reaction medium such as water, benzene or xylene. The exact amounts of the 10-halophenoxarsine and acid salt reagents to be employed are not critical, some of the desired products being obtained when employing any proportions of ingredients. In the preferred mode of operation, about one molecular proportion of 10-halophenoxarsine is reacted with one molecular proportion of the mono salt of the acid reagents, or with about 0.5 molecular proportion of the di-salt of the dicarboxylic acids. The reaction takes place smoothly at temperatures of from 0° to 140° C. with the production of the desired product and alkali metal chloride of reaction. In carrying out the reaction, the 10-halophenoxarsine and alkali metal salt of the acid, such as the sodium or potassium salt, are mixed and contacted together in any convenient fashion and maintained for a period of time at a temperature of from 0° to 140° C. to complete the reaction. Following the reaction, the desired product may be separated by conventional procedures such as washing with water, filtration and decantation and recrystallization from common organic solvents.

EXAMPLE 1

*S-(10-Phenoxarsinyl) Thiolacetate*

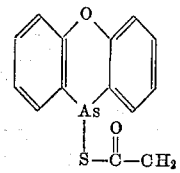

Thiolacetic acid (3.04 grams; 0.04 mole) was added rapidly to 10 grams (0.02 mole) of 10,10'-oxybisphenoxarsine dispersed in 100 milliliters of benzene. The addition was carried out with stirring and at about 40° C. Following the addition, the reaction mixture was heated at the boiling temperature and under reflux for 40 minutes to complete the reaction. The mixture was then treated while hot with activated charcoal, filtered and the solvent removed from the filtrate by evaporation under reduced pressure. As a result of these operations, there was obtained an S-(10-phenoxarsinyl) thiolacetate as a crystalline solid. This product was recrystallized from a mixture of diethyl ether and cyclohexane and found to melt at 91.5°–92.5° C. and to have carbon, sulfur and hydrogen contents of 52.64 percent, 3.41 percent and 10.20 percent, respectively, as compared to theoretical contents of 52.84 percent, 3.49 percent, and 10.08 percent.

EXAMPLE 2

S-(10-Phenoxarsinyl) Thiolvalerate

Thiolvaleric acid (18 grams; 0.152 mole) was added rapidly with stirring to 37.6 grams (0.075 mole) of 10,10'-oxybisphenoxarsine dispersed in 500 milliliters of benzene. Following the addition, the temperature of the reaction mixture was raised to the boiling temperature and maintained thereat with the mixture under reflux for 20 minutes to complete the reaction. The benzene reaction medium was then removed by evaporation under reduced pressure to obtain an S-(10-phenoxarsinyl) thiolvalerate product as a crystalline solid. This product was recrystallized from nitromethane and found to melt at 68.5°–69.5° C. and to have carbon, hydrogen and sulfur contents of 56.63 percent, 4.71 percent and 9.02 percent, respectively, as compared to theoretical contents of 56.67 percent, 4.76 percent, and 8.90 percent.

EXAMPLE 3

S-(10-Phenoxarsinyl) Thiolcaprylate

Potassium thiolcaprylate (27.8 grams; 0.014 mole) in 160 milliliters of water was added rapidly with stirring to 27.8 grams (0.1 mole) of 10-chlorophenoxarsine dispersed in 400 milliliters of acetone. Stirring was thereafter continued and the mixture raised to the boiling temperature for 15 minutes and thereafter diluted with 400 milliliters of ice water. Following the latter dilution, the mixture separated into an aqueous layer and an oily layer. The oily layer was separated by decantation to obtain a product which crystallized upon standing. This product was washed with water and dissolved in a mixture of ethanol and ethyl acetate. This mixture was concentrated by evaporation of solvent to obtain an S-(10-phenoxarsinyl) thiolcaprylate product as a crystalline solid. The product was recrystallized from a mixture of ethanol and ethyl acetate and found to melt at 45° C. and to have carbon, hydrogen and sulfur contents of 59.70 percent, 5.76 percent and 7.97 percent, respectively, as compared to theoretical contents of 59.69 percent, 5.58 percent, and 8.02 percent.

EXAMPLE 4

S-(10-Phenoxarsinyl) Thiolnonanoate

Thiolnonanoic acid (38.4 grams; 0.22 mole) was added rapidly with stirring to 50.2 grams (0.1 mole) of 10,10'-oxybisphenoxarsine dispersed in 670 milliliters of benzene and the resulting mixture heated for one hour at the boiling temperature to complete the reaction. The benzene was then removed by evaporation under vacuum and the residue recrystallized from nitromethane to obtain an S-(10-phenoxarsinyl) thiolnonanoate product as a crystalline solid melting at 46°–48° C. This product had carbon and sulfur contents of 60.63 percent and 7.78 percent, respectively, as compared to theoretical contents of 60.57 percent, and 7.7 percent.

EXAMPLE 5

Bis[S-(10-Phenoxarsinyl)] Dithioloxalate

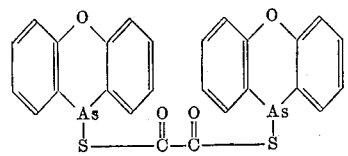

Dipotassium dithioloxalate (5.1 grams; 0.0257 mole) in 65 milliliters of water was added rapidly with stirring to 14.3 grams (0.0514 mole) of 10-chlorophenoxarsine dispersed in 200 milliliters of acetone. During the addition, a crystalline solid formed in the reaction mixture. This solid was separated by filtration and recrystallized from benzene to obtain a bis[S-(10-phenoxarsinyl)] dithioloxalate product melting at 183°–184° C. This product had carbon and sulfur contents of 51.99 percent and 10.29 percent, respectively, as compared to theoretical contents of 51.5 percent and 10.58 percent.

EXAMPLE 6

S-(10-Phenoxarsinyl) Thiollaurate

Thiollauric acid (32.5 grams; 0.150 mole) was added rapidly with stirring to 37.6 grams (0.075 mole) of 10,10'-oxybisphenoxarsine dispersed in 500 milliliters of benzene and the resulting mixture heated at the boiling temperature and under reflux for one hour to complete the reaction. The benzene was then removed by evaporation under vacuum to obtain an oily liquid as a residue. This liquid crystallized upon standing and the crystalline product was successively recrystallized from nitromethane and ethanol. As a result of these operations there was obtained S-(10-phenoxarsinyl) thiollaurate product melting at 59.5°–60.5° C.

EXAMPLE 7

S-(10-Phenoxarsinyl) β-Cyclohexylthiolpropionate

β-Cyclohexylthiolpropionic acid (20.9 grams; 0.121 mole) was added rapidly with stirring to 30.1 grams (0.06 mole) of 10,10'-oxybisphenoxarsine dispersed in 400 milliliters of benzene and the resulting mixture heated at the boiling temperature and under reflux for 45 minutes. The reaction medium was then removed by evaporation under vacuum and the residue dispersed in hot nitromethane. The nitromethane solution was then cooled. During the cooling, an S-(10-phenoxarsinyl) β-cyclohexylthiolpropionate product solidified therein as a crystalline solid and was separated by filtration. This product melted at 84°–84.5° C. and had carbon and sulfur contents of 60.77 percent and 7.83 percent, respectively, as compared to theoretical contents of 60.87 percent and 7.74 percent.

EXAMPLE 8

S-(10-Phenoxarsinyl) Phenylthiolacetate

Phenylthioacetic acid (18.4 grams; 0.121 mole) was added rapidly with stirring to 30.1 grams (0.06 mole) of 10,10'-oxybisphenoxarsine dispersed in 400 milliliters of benzene, and the resulting mixture heated at the boiling temperature for 30 minutes to complete the reaction. Upon removal of the reaction medium by evaporation, an S-(10-phenoxarsinyl) phenylthiolacetate product was obtained as a crystalline residue. This product was recrystallized from nitromethane and found to melt at 122°–123° C. and have carbon and sulfur contents of 60.64 percent and 8.31 percent, respectively, as compared to theoretical contents of 60.92 percent and 8.13 percent.

EXAMPLE 9

S-(10-Phenoxarsinyl) Ethyl Xanthate

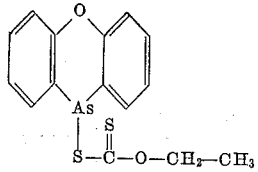

Potassium ethyl xanthate (10.1 grams; 0.07 mole) in 50 milliliters of ethanol was added rapidly with stirring to 13.9 grams (0.05 mole) of 10-chlorophenoxarsine dispersed in 200 milliliters of benzene. Stirring was thereafter continued and the reaction mixture heated at a temperature of from 50°–60° C. for one hour to complete the reaction. Following the heating period, the mixture was cooled, filtered and the solvent removed from the filtrate by evaporation under reduced pressure. As a result of these operations, there was obtained an S-(10-phenoxarsinyl) ethyl xanthate as a crystalline solid melting at 79°–81° C. This product had carbon and sulfur contents of 49.42 percent and 17.5 percent, respectively, as compared to theoretical contents of 49.45 percent and 17.6 percent.

EXAMPLE 10

S-(10-Phenoxarsinyl) Octyl Xanthate

Potassium octyl xanthate (29.3 grams; 0.12 mole) was added portionwise with stirring over a short period to 27.8 grams (0.1 mole) of 10-chlorophenoxarsine dispersed in 250 milliliters of benzene. Stirring was thereafter continued and the mixture heated at the boiling temperature for one hour and under reflux to complete the reaction. The reaction mixture was then filtered and the solvent removed from the filtrate by evaporation under reduced pressure to obtain an S-(10-phenoxarsinyl) octyl xanthate product as a crystalline solid melting at 47°–48° C. and having carbon and sulfur contents of 56.28 percent and 14.23 percent, respectively, as compared to theoretical contents of 56.24 percent and 14.3 percent.

EXAMPLE 11

S-(10-Phenoxarsinyl) Cyclohexyl Xanthate

Potassium cyclohexyl xanthate (15 grams; 0.07 mole) was added portionwise with stirring over a short period to 13.9 grams (0.05 mole) of 10-chlorophenoxarsine dispersed in 250 milliliters of benzene, and the resulting mixture heated for one hour at the boiling temperature and under reflux. The mixture was then filtered and the reaction medium removed from the filtrate by evaporation under reduced pressure to obtain an S-(10-phenoxarsinyl) cyclohexyl xanthate product as a crystalline solid melting at 90°–91° C.

EXAMPLE 12

S-(10-Phenoxarsinyl) Allyl Xanthate

Potassium allyl xanthate (12.1 grams; 0.07 mole) was added portionwise with stirring over a short period to 13.9 grams (0.05 mole) of 10-chlorophenoxarsine dispersed in 250 milliliters of benzene, and the resulting mixture heated at the boiling temperature and under reflux for ½ hour. The reaction mixture was then filtered and the filtrate diluted with a mixture of ethanol and cyclohexane. During the dilution, an S-(10-phenoxarsinyl) allyl xanthate product separated in the mixture as a crystalline solid and was separated by filtration and the residue recrystallized from ethanol. This product melted at 99°–100° C. and had carbon, hydrogen and sulfur contents of 50.94 percent, 3.46 percent and 16.7 percent, respectively, as compared to theoretical contents of 51.06 percent, 3.48 percent and 17.1 percent.

EXAMPLE 13

S-(10-Phenoxarsinyl) Phenoxythiolacetate

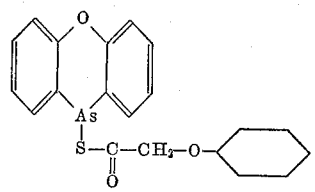

Phenoxythiolacetic acid (27.8 grams; 0.165 mole) and 0.075 mole of 10,10'-oxybisphenoxarsine were dispersed in 500 milliliters of benzene and the resulting mixture heated at the boiling temperature and under reflux for 0.5 hour. The heating was carried out with distillation of water of reaction as formed together with some of the solvent, separation of the water and recycling of the solvent. The reaction medium was then removed by evaporation under reduced pressure and the residue recrystallized from ethanol. As a result of these operations, there was obtained an S-(10-phenoxarsinyl) phenoxythiolacetate product as a crystalline solid melting at 108°–108.5° C. and having a carbon and hydrogen content of 58.48 percent and 3.61 percent, respectively, as compared to theoretical contents of 58.54 percent and 3.69 percent.

EXAMPLE 14

S-(10-Phenoxarsinyl) 2,4-Dichlorophenoxythiolacetate 2,4-dichlorophenoxythiolacetic acid (41 grams; 0.15 mole) and 0.075 mole of 10,10'-oxybisphenoxarsine were dispersed in 500 milliliters of benzene and the resulting mixture heated at the boiling temperature and under reflux for 40 minutes. The heating was carried out with distillation of the water of reaction as formed together with some of the reaction solvent, separation of the water and recycling of the solvent. Following the heating period, the reaction medium was separated by evaporation under reduced pressure and the residue recrystallized from nitromethane. As a result of these operations, there was obtained an S-(10-phenoxarsinyl) 2,4-dichlorophenoxythiolacetate product melting at 128.5–129.5° C. and having carbon and hydrogen contents of 50.24 percent and 2.62 percent, respectively, as compared to theoretical contents of 50.13 percent and 2.73 percent.

EXAMPLE 15

S-(10-Phenoxarsinyl) 4-Ethoxyphenoxythiolacetate 4-ethoxyphenoxythiolacetic acid (31.9 grams; 0.15 mole) and 0.075 mole of 10,10'-oxybisphenoxarsine were dispersed in 500 milliliters of benzene and the resulting mixture heated at the boiling temperature and under reflux for 45 minutes. The heating was carried out with distillation of the water of reaction together with some of the reaction medium, separation of the water and recycling of the reaction medium. The reaction medium was then removed by evaporation under reduced pressure to obtain an S-(10-phenoxarsinyl) 4-ethoxyphenoxythiolacetate product as a crystalline residue melting at 108°–109° C. and having a carbon content of 58.95 percent as compared to a theoretical content of 58.16 percent.

EXAMPLE 16

S-(10-Phenoxarsinyl) 2-Methoxythiolbenzoate

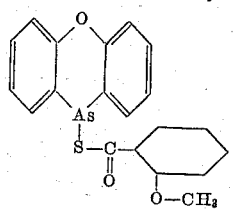

2-methoxythiolbenzoic acid (27.8 grams; 0.165 mole)

and 0.075 mole of 10,10′-oxybisphenoxarsine were dispersed in 500 milliliters of benzene and the resulting mixture heated at the boiling temperature and under reflux in the manner as described in the preceding example. Following the heating period, the reaction medium was removed by evaporation under vacuum and the residue recrystallized from nitromethane to obtain an S-(10-phenoxarsinyl) 2-methoxythiolbenzoate product as a crystalline solid. This product melted at 134.5°–135.5° C. and had carbon and hydrogen contents of 58.55 percent and 3.82 percent, respectively, as compared to theoretical contents of 58.54 percent and 3.69 percent.

EXAMPLE 17

S-(10-Phenoxarsinyl) 4-Butoxythiolbenzoate 4-butoxythiolbenzoic acid (31.6 grams; 0.15 mole) and 0.075 mole of 10,10′-oxybisphenoxarsine were dispersed in 500 milliliters of benzene and the resulting mixture heated at the boiling temperature and under reflux for 45 minutes in the manner as previously described. The reaction medium was then recovered by evaporation under vacuum and the residue recrystallized from a mixture of ethanol and benzene. As a result of these operations, there was obtained an S-(10-phenoxarsinyl) 4-butoxythiolbenzoate product as a crystalline solid melting at 89.5°–90.5° C. and having carbon and hydrogen contents of 61.12 percent and 4.75 percent, respectively, as compared to theoretical contents of 61.06 percent and 4.68 percent.

EXAMPLE 18

S-(10-Phenoxarsinyl) 3,4,5-Trimethoxythiolbenzoate 3,4,5-trimethoxythiolbenzoic acid (34.3 grams; 0.15 mole) and 0.075 mole of 10,10′-oxybisphenoxarsine were dispersed in 500 milliliters of benzene and the resulting mixture heated at the boiling temperature and under reflux for one hour in the manner as previously described. The benzene was then removed by evaporation under vacuum and the residue recrystallized from nitromethane to obtain an S-(10-phenoxarsinyl) 3,4,5-trimethoxythiolbenzoate product as a crystalline solid. This product melted at 142°–144° C. and had carbon and hydrogen contents of 55.97 percent and 4.04 percent, respectively, as compared to theoretical contents of 56.18 percent and 4.07 percent.

EXAMPLE 19

S-(10-Phenoxarsinyl) 4-Amyloxythiolbenzoate 4-amyloxythiolbenzoic acid (13.6 grams; 0.0605 mole) was added rapidly with stirring to 15.1 grams (0.03 mole) of 10,10′-oxybisphenoxarsine dispersed in 200 milliliters of benzene and the resulting mixture heated at the boiling temperature and under reflux for 0.5 hour. The heating was carried out with distillation of the water of reaction as formed together with some of the reaction medium, separation of the water and recycling of the reaction medium. Following the heating period, the reaction medium was removed by evaporation under vacuum and the residue recrystallized from ethanol to obtain an S-(10-phenoxarsinyl) 4-amyloxythiolbenzoate product as a crystalline solid. This product melted at 102°–103° C. and had carbon and hydrogen contents of 61.96 percent and 4.95 percent, respectively, as compared to theoretical contents of 61.8 percent and 4.97 percent.

In a similar manner, other S-(10-phenoxarsinyl) esters of the present invention may be prepared as follows:

S-(10-phenoxarsinyl) thiolpropionate (melting at 72°–73° C.) by reacting together 10-bromophenoxarsine and sodium thiolpropionate.

Mono[S-(10-phenoxarsinyl)] dithiolglutarate (molecular weight of 406.32) by reacting together 10,10′-oxybisphenoxarsine and dithiolglutaric acid.

S-(10-phenoxarsinyl) thiolbutyrate (melting at 72°–72.5° C.) by reacting together 10,10′-oxybisphenoxarsine and thiolbutyric acid.

Bis[S-(10-phenoxarsinyl)] dithiolsuccinate (molecular weight of 634.37) by reacting together 10,10′-oxybisphenoxarsine and dithiolsuccinic acid.

Mono[S-(10-phenoxarsinyl)] dithiolsuberate (molecular weight of 448.41) by reacting together 10-chlorophenoxarsine and monosodium dithiolsuberate.

Bis[S-(10-phenoxarsinyl)] dithiolazelate (molecular weight of 704.52) by reacting together 10,10′-oxybisphenoxarsine and dithiolazelaic acid.

Bis[S-(10-phenoxarsinyl)] dithioltetradecanedioate (molecular weight of 774.67) by reacting together 10-chlorophenoxarsine and disodium dithioltetradecanedioate.

Bis[S-(10-phenoxarsinyl)] dithioloctadecanedioate (molecular weight of 830.79) by reacting together 10,10′-oxybisphenoxarsine and dithioloctadecanedioic acid.

S-(10-phenoxarsinyl) thiolisobutyrate (melting at 62.5°–63.5° C.) by reacting together 10,10′-oxybisphenoxarsine and thiolisobutyric acid.

S-(10-phenoxarsinyl) 3-butenyl xanthate (molecular weight of 390.33) by reacting together 10-chlorophenoxarsine and sodium 3-butenyl xanthate.

S-(10-phenoxarsinyl) methallyl xanthate (molecular weight of 390.33) by reacting together 10-chlorophenoxarsine and potassium methallyl xanthate.

S-(10-phenoxarsinyl) 4-pentenyl xanthate (molecular weight of 404.36) by reacting together 10-chlorophenoxarsine and potassium 4-pentenyl xanthate.

S-(10-phenoxarsinyl) pentyl xanthate (molecular weight of 406.37) by reacting together 10-bromophenoxarsine and sodium pentyl xanthate.

S-(10-phenoxarsinyl) undecyl xanthate (molecular weight of 490.53) by reacting together 10-chlorophenoxarsine and potassium undecyl xanthate.

S-(10-phenoxarsinyl) octadecyl xanthate (molecular weight of 588.71) by reacting together 10-chlorophenoxarsine and potassium octadecyl xanthate.

S-(10-phenoxarsinyl) thiolheptanoate (melting at 63°–64° C.) by reacting together 10,10′-oxybisphenoxarsine and thiolheptanoic acid.

S-(10-phenoxarsinyl) Δ-cyclohexylthiolpentanoate (molecular weight of 442.42) by reacting together 10-chlorophenoxarsine and potassium Δ-cyclohexylthiolpentanoate.

S-(10-phenoxarsinyl) α-phenylthiolpropionate (molecular weight of 408.31) by reacting together 10-chlorophenoxarsine and potassium α-phenylthiolpropionate.

S-(10-phenoxarsinyl) 4-methoxythiolbenzoate (melting at 118–118.5° C.) by reacting together 10,10′-oxybisphenoxarsine and 4-methoxythiolbenzoic acid.

S-(10-phenoxarsinyl 2-methylphenylthiolacetate (molecular weight 408) by reacting together 10,10′-oxybisphenoxarsine and 2-methylphenylthiolacetate.

S-(10-phenoxarsinyl) 2-bromophenylthiolpropionate (molecular weight 479) by reacting together 10,10′-oxybisphenoxarsine and 2-bromophenylthiolpropionic acid.

S-(10-phenoxarsinyl) 2,4,5,6-tetrachlorothiolbenzoate (molecular weight 517) by reacting together 10,10′-oxybisphenoxarsine and 2,4,5,6-tetrachlorothiolbenzoic acid.

S-(10-phenoxarsinyl) 4-ethoxythiolbenzoate (melting at 136–137° C.) by reacting together 10,10-oxybisphenoxarsine and 4-ethoxythiolbenzoic acid.

S-(10-phenoxarsinyl) 2,4-dimethylthiolbenzoate (molecular weight 408) by reacting together 10,10′-phenoxarsine and 2,4-dimethylthiolbenzoic acid.

S-(10-phenoxarsinyl) 4-butylphenylthiolbutyrate (molecular weight 478) by reacting together 10,10′-oxybisphenoxarsine and 4-butylphenylthiolbutyric acid.

S-(10-phenoxarsinyl) 3,5-dimethoxythiolbenzoate (melting at 114°–114.5° C.) by reacting together 10,10′-oxybisphenoxarsine and 3,5-dimethoxythiolbenzoic acid.

S-(10-phenoxarsinyl) 4-amyloxyphenoxythiolacetate (molecular weight 496) by reacting together 10,10′-oxybisphenoxarsine and 4-amyloxyphenoxythiolacetic acid.

S-(10-phenoxarsinyl) 4-methylphenoxythiolpropionate (molecular weight 426) by reacting together 10,10′-oxybisphenoxarsine and 4-methylphenoxythiolpropionate.

S-(10-phenoxarsinyl) 2,4,5-trichlorophenoxythiolpropionate (molecular weight 527) by reacting together 10,10'-oxybisphenoxarsine and 2,4,5-trichlorophenoxythiolpropionic acid.

S-(10-phenoxarsinyl) 3,4,5-triethoxythiolbenzoate (melting at 130.5°–131.5° C.) by reacting together 10,10'-phenoxarsine and 3,4,5-triethoxythiolbenzoic acid.

S-(10-phenoxarsinyl) 2-butylphenoxythiolbutyrate (molecular weight 494) by reacting together 10,10'-oxybisphenoxarsine and 2-butylphenoxythiolbutyric acid.

S-(10-phenoxarsinyl) 4-bromophenoxythiolacetate (molecular weight 489) by reacting together 10,10'-oxybisphenoxarsine and 4-bromophenylthiolacetic acid.

The xanthate materials employed as starting products in accordance with the present teachings may be prepared by reacting together (1) cyclohexanol or a suitable alkanol or lower alkenyl alcohol, (2) an alkali metal hydroxide and (3) carbon disulfide. In carrying out the reaction, the alcohol and alkali metal hydroxide may be dispersed in an organic liquid as reaction medium and the carbon disulfide added thereto with stirring. Upon completion of the reaction, the desired alkali metal xanthate product may be separated from the reaction mixture by conventional methods.

The alkane dithioldicarboxylic acids, thiolalkanoic acids and substituted lower-thiolalkanoic acids employed as starting materials in accordance with the present teachings may be prepared in known procedures from the acid halides of the corresponding alkane dicarboxylic acids, alkanoic acids and substituted lower-alkanoic acids by treating the acid halide at a temperature of from about −10° to 25° C. with ethanolic potassium hydrosulfide (KSH). In the preferred procedure, the potassium hydrosulfide is prepared by saturating with hydrogen sulfide ($H_2S$), a solution of potassium hydroxide in aqueous 90 percent ethanol at a temperature of from about 0°–25° C. The acid halide is then added to this solution at the contacting temperature range, and the reaction mixture subsequently filtered to separate potassium halide by-product. The reaction medium is then removed from the filtrate by evaporation under reduced pressure, and the residue dispersed in water and the dispersion acidified with hydrochloric acid. The acidified mixture is then extracted with a water immiscible organic liquid such as diethyl ether and the ether removed from the extract by evaporation to obtain the desired thiolacid as a liquid or solid residue.

The novel compounds of the present invention are useful as parasiticides and herbicides for the control of a number of pests and the inhibition of the growth of a number of weed and plant species. For such uses, the products may be dispersed on an inert finely divided solid and employed as dusts. Such mixtures may also be dispersed in water with or without the aid of a surface active agent and employed as sprays. In other procedures, the products may be employed as active constituents in oil-in-water or water-in-oil emulsions and in aqueous dispersions. In representative operations, aqueous compositions containing 500 parts per million by weight of one of the compounds S-(10-phenoxarsinyl) thiolacetate, S-(10-phenoxarsinyl) propyl xanthate, and bis[S-(10-phenoxarsinyl)] thioloxalate give 100 percent kills of mites, flies, and Southern army worms. In further operations, compositions containing 10 parts per million by weight of one of these same compounds give 100 percent kills of *Fusarium oxysporum lycopersici* and Cabomba.

This application is a continuation-in-part of our copending application Serial No. 17,449, filed March 25, 1960, and now abandoned.

We claim:

1. The S-(10-phenoxarsinyl) ester of a member of the group consisting of an alkane dithioldicarboxylic acid containing up to 18 carbon atoms, thiolalkanoic acid containing up to 18 carbon atoms, alkyl xanthic acid containing up to 18 carbon atoms, lower-alkenyl xanthic acid, cyclohexyl xanthic acid, cyclohexyl lower-thiolalkanoic acid, phenyl lower-thiolalkanoic acid, phenoxy lower-thiolalkanoic acid and substituted lower-thiolalkanoic acid wherein the substituents are selected from the group consisting of chlorophenoxy, chlorophenyl, bromophenoxy, bromophenyl, lower-alkoxyphenoxy, lower-alkylphenoxy, lower-alkoxyphenyl and lower-alkylphenyl.

2. S-(10-phenoxarsinyl) allyl xanthate.
3. S-(10-phenoxarsinyl) thiolacetate.
4. S-(10-phenoxarsinyl) octyl xanthate.
5. S-(10-phenoxarsinyl) cyclohexyl xanthate.
6. S-(10-phenoxarsinyl) thiolvalerate.

References Cited in the file of this patent

FOREIGN PATENTS

F14,431   Germany _____ Sept. 29, 1955
             (IVc–120)